Figure 1:
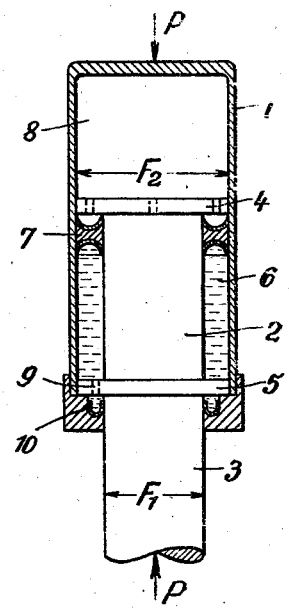

Dec. 7, 1937.  H. SCHUMACHER  2,101,757
SHOCK ABSORBER
Filed Oct. 10, 1935

Patented Dec. 7, 1937

2,101,757

UNITED STATES PATENT OFFICE 2,101,757

SHOCK ABSORBER

Heinrich Schumacher, Berlin, Germany, assignor to Fein-Maschinenbaugesellschaft m. b. H., Berlin, Germany Application October 10, 1935, Serial No. 44,409
In Germany October 16, 1934

4 Claims. (Cl. 267—64)

Hydraulic shock absorbers as known at the present day can be divided into two groups, namely those connected in parallel and those connected in series.

In the shock absorbers of the first type, a plurality of shock absorber devices, for instance, a resilient absorber and a hydraulic absorber, is so arranged that the forces exerted by the two absorbers are additive and act simultaneously throughout a resilient movement.

In contradistinction to this, in the shock absorbers of the second type, a plurality of shock absorbers is so arranged that the resilient movement is divided up between them, so that the forces exerted by them do not act additively but are correlated to one another and exert their effect over the total resilient movement.

Shock absorbers of the first type mostly have the disadvantage that they are very sensitive to changes in speed; such changes give rise to uncontrollable forces which may lead to breakage.

To avoid these disadvantages, shock absorbers of the second type were devised; in these absorbers, the additive action of the forces was intentionally disregarded and it was thought sufficient to increase the resilient movement.

As regards the working diagrams of the respective types of shock absorbers, these differ in that owing to the additive action of the forces, more complete diagrams can be obtained with shock absorbers connected in parallel than with series—connected shock absorbers, since in the latter case the resilient absorber will always prevent the liquid force from becoming greater than the particular resilient force.

In order to absorb a shock of given energy over a minimum resilient movement it is necessary that the working diagram should be as complete as possible, that is, the damping force should be as constant as possible throughout the resilient movement. For the above-mentioned reasons, this requirement can only be fulfilled with shock absorbers connected in parallel, but as has already been stated these give rise to uncontrollable forces and, thus, to a danger of breakage, owing to their great sensitivity to sudden changes in speed. In order to prevent this danger, the liquid ports are usually made so large that the maximum shock speed to be expected, only gives rise to a certain maximum liquid force. The result, however, is that, at the commonest medium speeds the damping produced by the hydraulic device is very slight, that is, the working diagram is far from complete.

The object of the present invention is to remedy this drawback without rendering the working diagram incomplete to any great extent.

The above object is achieved by a shock absorber for aircraft and motor vehicles, comprising two pistons movable relatively to one another, and liquid means for damping said relative movement, wherein one of the two pistons is in the form of a floating piston separating the damping liquid from a resilient part of the device and acting to vary the effective piston surface in accordance with the speed of the occurring shock. The surface area of the floating piston which separates the two media (damping liquid and resilient part) is so chosen that the static force thereon bears a certain relation to the maximum shock force to be expected. If the liquid force produced by a shock exceeds the load on the floating piston, at any instant, the piston yields easily, thus avoiding the occurrence of excessive forces.

The floating piston does not serve as a working piston, but as a separating and safety piston; movement of the piston only takes place as far as is necessary, firstly, to insure a permanently closed liquid chambers and, secondly, to avoid excessive forces and thus insure as constant a damping force as possible over the entire resilient movement.

Furthermore, the liquid chamber is closed in all directions and is subjected to pressure by the floating piston, so that the shock absorber is effective in all positions, whether horizontal, vertical or inclined, and, moreover, the sealing sleeves or glands are always completely submerged in the liquid, thus preventing them from drying and causing the shock absorber to leak.

The floating piston also prevents any liquid flowing into the chamber housing the resilient part and, thus, the formation of an emulsion, that is, an air-liquid mixture, is prevented.

Two constructions of shock absorber according to the invention are illustrated, by way of example, in the two figures respectively of the accompanying drawing.

Figure 2:
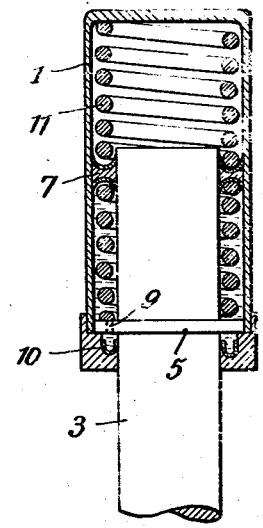

Figure 1 illustrates a sectional view of one form of construction, while Figure 2 shows a modified form in a similar sectional view.

Referring to Fig. 1, sliding in a cylinder 1 is a piston 2, which is connected at its outer end to the piston rod 3. The piston 2 comprises end discs 4 and 5 which enclose an annular space 6. Sliding in this annular space 6 is an annular, floating, piston 7, which is guided between the cylinder wall and the piston and is provided with sealing means at the top and bottom. In this manner, the compression chamber 8 is completely separated from the annular space 6. The upper end disc 4 is provided with holes or slots, so that the pressure in the compression chamber 8 acts directly on the annular piston 7. The lower end disc 5 carries one or more tapered ports 9 or valves, and forms in combination with the floating piston 7 the actual hydraulic shock absorber. The cylinder 1 is sealed at the bottom by a cap 10. The compression chamber 8 is filled with compressed air and the annular space 6 with liquid. In the extended condition of the shock absorber, the annular separating piston 7 is in its uppermost position adjacent the end disc 4.

The mode of operation of the shock absorber is as follows: When the shock absorber is slowly, i. e. statically, loaded, the piston 2 slowly enters the compression chamber 8, while the liquid contained in the annular space 6 slowly flows through the openings 9 into the annular space which is left between the end disc 5 and the cap 10, without the floating piston 7 undergoing, in this case, a change of position or a pressure difference arising between this annular space and the space 6. The effective piston surface is therefore equal to the surface F of the piston rod. The compression chamber alters only by the volume of the piston 2 entering it. The air compressed above the end disc 4 passes through the channels provided in this disc into the annular space surrounding the piston 2 and formed between the disc 4 and the floating piston 7, in which space the same pressure arises. The working diagram substantially corresponds to the isothermal compression curve of air.

However, if the shock absorber is quickly, i. e. dynamically, loaded, the effective piston surface alters immediately, because the liquid cannot flow so quickly through the apertures 9 into the lower annular space and, therefore, it presses the floating piston 7 upwards, so that the effective piston surface acting on the compression chamber 8 is enlarged by the surface of the floating piston 7. According to the speed at which the shock occurs, a pressure difference arises above and below the end disc 5 and the resultant force of this pressure difference acts on the floating piston 7. It is an important fact, however, that this additional resultant force can only attain the magnitude the resilient pneumatic pressure which is exerted at the moment upon the floating piston 7. Therefore, excessive forces of any magnitude cannot occur, however sudden the speed changes of the shock may be.

Although when a load is applied slowly the surface F is the effective area of the piston, the compression ratio for impulsive loading alters as far as is necessary for maintaining the damping force constant. The alteration of the compression chamber in any particular case is dependent upon the particular effective piston surface, that is, upon the quantity of liquid flowing over at the time. Therefore, the working diagram can be adjusted both by the liquid force and by varying the degree of compression. This is obtained by correctly designing the ports or valves provided in the end disc 5.

Fig. 2 illustrates a further embodiment in which there is used as resilient member within the cylinder 1, instead of air, a helical spring 11 which bears on the floating piston 7 which is slidably guided on the piston 2. The annular space may, in this case, be filled with a damping liquid, as in the construction according to Fig. 1, and/or may contain a further helical spring. The mode of operation is the same as in the embodiment according to Fig. 1.

Of course, other forms of construction are possible without departing from the invention. For example, instead of helical springs, rubber buffers or other resilient members may be used.

I claim:—

1. Shock absorber comprising an air chamber, a piston within said air chamber, a flange upon the leading end of said piston, ports in said flange, a second piston surrounding the first and fitting closely between said first piston and the inner wall of said air chamber outwardly of said flange, a liquid chamber on the outer side of the second said piston, a second flange upon the first said piston projecting into said liquid chamber and ports through said second flange, affording communication for the liquid in said liquid chamber between the two sides of the second said flange.

2. In a shock absorber comprising a cylinder having two chambers, resilient means in one chamber, fluid in the other chamber, a piston in said cylinder having a rod and acting simultaneously to compress said resilient means and to have a retarded passage through said fluid, and a floating compensating piston comprising an annular member slidably mounted on said piston rod and defining one wall of said fluid chamber.

3. Shock absorber comprising an air chamber, a piston longitudinally movable within the said air chamber, a second piston surrounding the first and forming an air and liquid tight seal between the first said piston and said air chamber, a liquid chamber in the space between the first said piston and the chamber wall on the side of the second said piston remote from said air chamber, and means connected to and movable simultaneously with the first said piston in the liquid contained in said liquid chamber.

4. Shock absorber comprising a casing, a piston within said casing forming an annular space between said casing and piston, a spring member restraining inward movement of said piston into said casing, a second piston closing the annular space between the first said piston and the wall of said casing and defining a liquid chamber in the annular space between said piston and the wall of said casing, and means movable with the first said piston and moving in said liquid chamber.

HEINRICH SCHUMACHER.